Jan. 8, 1924.　　　　　　　　　　　　　　　　　　　1,480,526
E. C. CHILES
CUTTER GRINDING ATTACHMENT FOR MEAT AND BONE GRINDERS
Filed March 12, 1923　　　　　　2 Sheets-Sheet 1
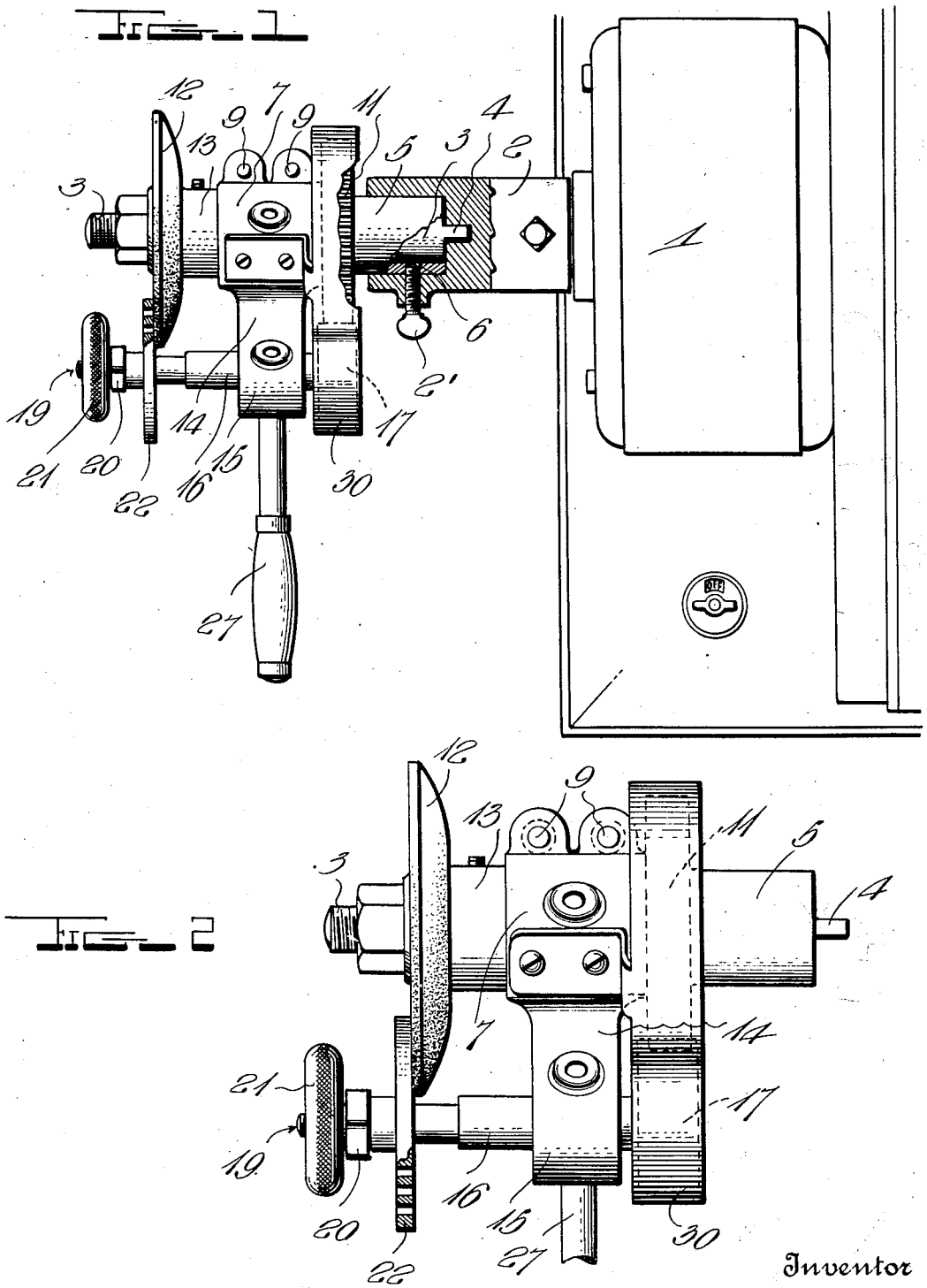
Inventor
Edwin Cheatham Chiles
By H. B. Willson &co
Attorneys
Witness

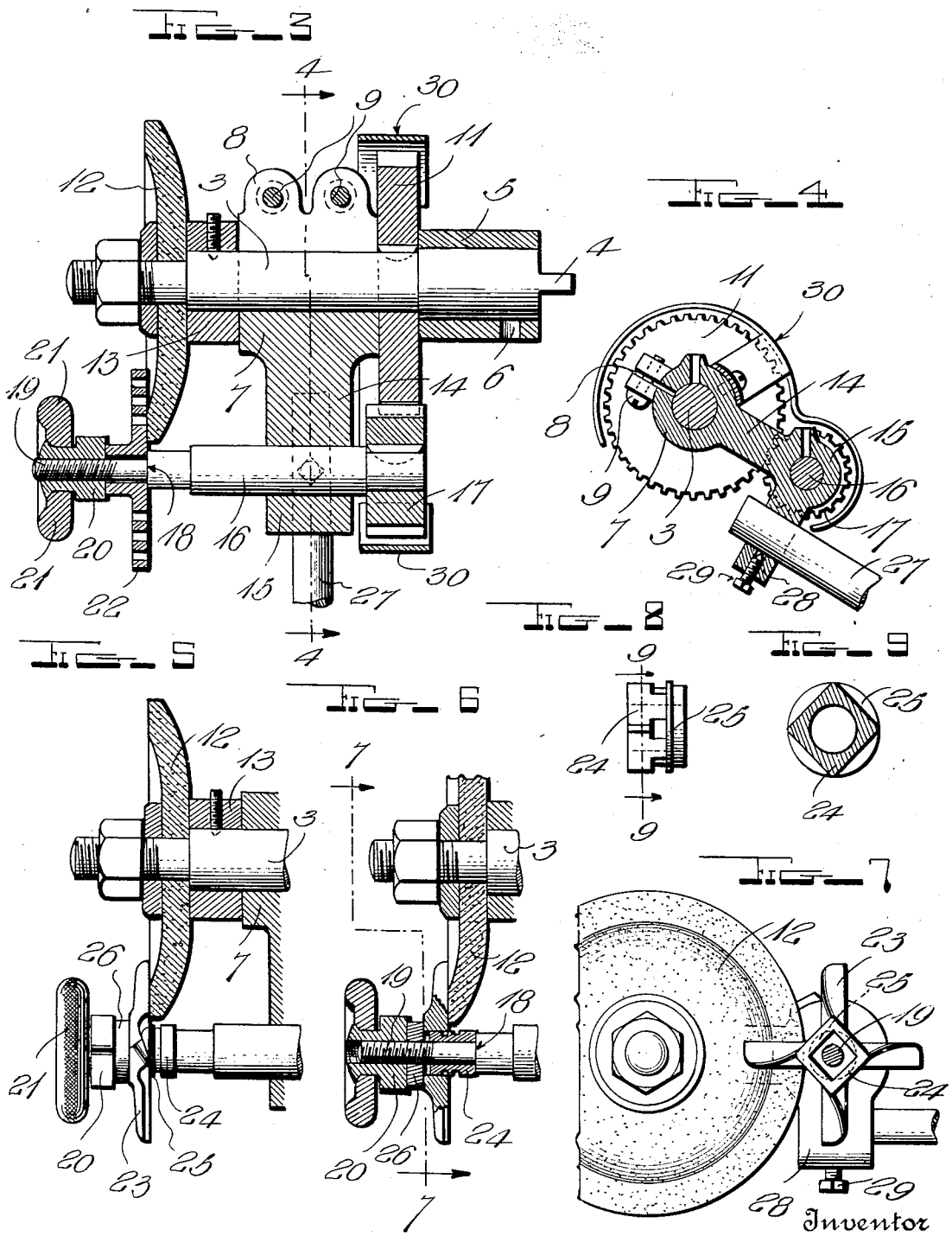

Patented Jan. 8, 1924.

1,480,526

UNITED STATES PATENT OFFICE.

EDWIN CHEATHAM CHILES, OF DENVER, COLORADO.

CUTTER-GRINDING ATTACHMENT FOR MEAT AND BONE GRINDERS.

Application filed March 12, 1923. Serial No. 624,621.

*To all whom it may concern:*

Be it known that I, EDWIN C. CHILES, a citizen of the United States, residing at Denver, in the county of Denver and State of Colorado, have invented certain new and useful Improvements in Cutter-Grinding Attachments for Meat and Bone Grinders; and I do declare the following to be a full, clear, and exact description of the invention, such as will enable others skilled in the art to which it appertains to make and use the same.

My invention relates to improvements in grinding machines and has for its object to provide a simple and inexpensive attachment for the well known meat and bone grinding machines commonly used in meat markets and the like, some of these machines being known as the "Hobart", "Royal", "Universal" and "Enterprise". Machines of these types have the grinding means detachably connected with a motor which is mounted on a suitable base and it is the principal object of my invention to provide an attachment which may readily be substituted for the grinding means and driven by the motor, for the purpose of effectively sharpening any of the cutters.

With the foregoing in view, the invention resides in the novel subject matter hereinafter described and claimed, the description being supplemented by the accompanying drawings.

Figure 1 is a top plan view partly broken away and in section, showing the application of my invention to an electric motor from which a grinding mechanism has been detached.

Figure 2 is a plan view of the attachment disconnected from the motor.

Figure 3 is substantially a horizontal sectional view.

Figure 4 is a vertical sectional view on line 4—4 of Fig. 3.

Figure 5 is a view similar to a portion of Fig. 2 showing the manner of mounting a different type of cutter to be sharpened, the cutter and the mounting means being shown in elevation.

Figure 6 is a view similar to Fig. 5 but illustrating the cutter and its mounting means in section.

Figure 7 is a vertical sectional view on line 7—7 of Fig. 6.

Figure 8 is a side elevation of the bushing which is used in mounting the cutter of Figs. 5 and 6 upon the grinding attachment.

Figure 9 is a sectional view on line 9—9 of Fig. 8.

In the drawings above briefly described, the numeral 1 designates an electric motor having a driven socket 2 for driving a meat or bone grinding mechanism, said socket having a set screw 2' for securing the driving shaft of the grinding mechanism therein. This meat or bone grinding mechanism has been removed in the present illustration and my knife sharpening attachment has been substituted in place thereof, to be driven by the socket 2.

The numeral 3 designates a short horizontal shaft adapted to fit within and to be driven by the socket 2, one end of said shaft preferably having a driving key 4 for engagement with the socket. On some forms of machines, the socket is of the proper size to directly receive the shaft 3, while in other instances, it is necessary to provide a bushing 5 of a suitable size, in order to obtain a snug fit. This bushing may well have an opening 6 formed therethrough. through which the set screw 2' may pass for contact with the shaft.

Rotatably mounted on the intermediate portion of the shaft 3, is a bearing 7 which is preferably split longitudinally as indicated at 8 and provided with screws of the like 9, for the purpose of taking up slight internal wear. At the inner end of the bearing 7, the shaft 3 is provided with a gear 11 while at the outer end of said bearing, said shaft is equipped with a grinding wheel 12 which is preferably backed by a collar 13 secured upon said shaft.

Laterally spaced from the bearing 7 and rigidly joined thereto by a metallic neck or the like 14, is a second bearing 15 whose axis is parallel with the axis of said bearing 7. A second shaft 16 is rotatably and slidably received in the bearing 15 and is provided on its inner end with a relatively wide pinion 17 meshing with the gear 11. The outer end of the shaft 16 is reduced to form a shoulder 18 and a threaded extension 19 extending outwardly beyond said shoulder. A clamping nut 20 is threaded upon this extension and a knob 21 is swiveled upon said nut. When a grinding plate 22 such as that shown in Figs. 1, 2, and 3 is to be sharpened, the nut 20 is removed from the extension 19 and said plate is slipped over said extension until it bears against the shoulder 18. Then, the nut 20 is rethreaded in place to clamp the plate upon the shaft. When the shafts 3 and 16 are now driven and inward pressure is exerted upon the knob 21 by the operator, the grinding plate 22 will be held against the grinding wheel 12 to perform the grinding operation, and it will be obvious that any desired degree of pressure may be exerted.

When grinding a rotary knife such as that illustrated at 23 in Figs. 5, 6 and 7, a squared bushing 24 may be slipped onto the threaded extension 19 for reception in the square central opening in the knife, said bushing having a shoulder 25 against which the knife will be clamped when the nut 20 is threaded into place. Preferably, a collar 26 is interposed between the nut and the knife.

For holding the body formed by the bearings 7 and 15 and the neck 14 against rotation, I provide this body with a rigid laterally extending handle 27 which may well be connected to the body by passing it through an opening in a lug 28 on the bearing 15, a set screw 29 being shown in said lug for securing the handle.

In order to prevent possible injury from the gears 11—17, a suitable guard 30 is preferably provided.

By employing the construction shown, or a substantial equivalent thereof, it will be seen that a device has been provided which may be used in connection with the meat and bone grinding machines now commonly employed in meat markets and the like, and that by the use of the attachment, a great saving can be effected, as it will not be necessary to have a traveling knife sharpener perform the knife grinding operation.

As excellent results have been obtained from the details disclosed, they are preferably followed, but within the scope of the invention as claimed, numerous minor changes may be made.

I claim:

1. A cutter grinding attachment for a meat grinder or similar machine comprising a shaft adapted to be coupled to a driven shaft of the machine, a bearing through which the intermediate portion of said shaft passes rotatably, a gear secured on said shaft at the inner end of said bearing, and a grinding wheel on said shaft at the outer end of said bearing; a second bearing laterally spaced from and parallel with the first named bearing, the two bearings being rigidly joined to each other; a second shaft rotatable and slidable in said second bearing and having on its inner end a pinion meshing with said gear, means for clamping a cutter on the outer end of said second shaft in overlapping relation with the outer side of said grinding wheel, and a knob swiveled on said outer end of said second shaft for permitting the operator to exert axial pressure thereon to hold the cutter against the grinding wheel.

2. A cutter grinding attachment for a meat grinder or similar machine comprising a shaft adapted to be coupled to a driven shaft of the machine, a bearing through which the intermediate portion of said shaft passes rotatably, a gear secured on said shaft at the inner end of said bearing, and a grinding wheel on said shaft at the outer end of said bearing; a second bearing laterally spaced from and parallel with the first named bearing, the two bearings being rigidly joined to each other; a second shaft rotatable and slidable in said second bearing and having on its inner end a pinion meshing with said gear, a nut threaded on the outer end of said second shaft for clamping a cutter thereon in overlapping relation with the outer side of said grinding wheel, and a knob swiveled on said nut for permitting the operator to exert axial pressure to hold the cutter against the grinding wheel.

3. A structure as specified in claim 1; the body formed by the two rigidly joined bearings being provided with a handle projecting in a direction transverse to said bearings.

In testimony whereof I have hereunto affixed my signature.

EDWIN CHEATHAM CHILES.